July 10, 1956
H. J. BROWN
2,754,466
PROTECTIVE CONVERTER SYSTEMS
Filed July 16, 1952
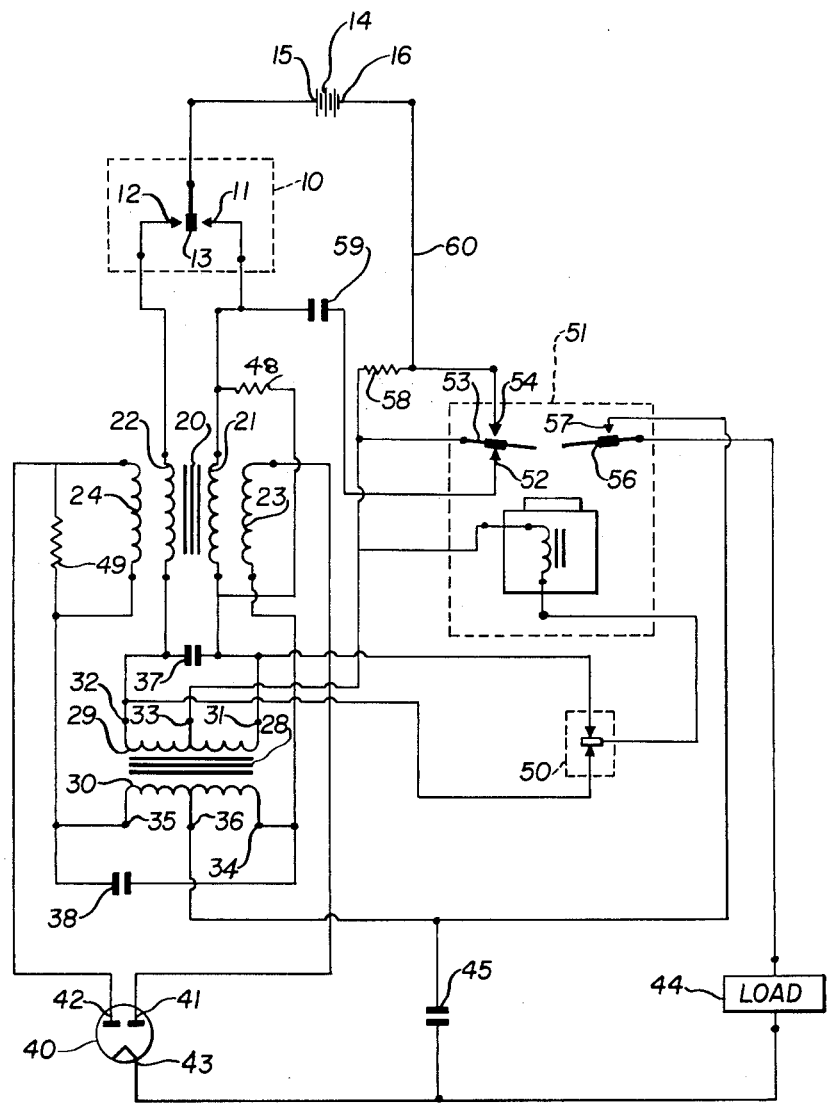
*INVENTOR.*
*HAROLD J. BROWN*
BY Woodling and Krost
attys.

United States Patent Office 2,754,466
Patented July 10, 1956

2,754,466

PROTECTIVE CONVERTER SYSTEMS

Harold J. Brown, Indianapolis, Ind.

Application July 16, 1952, Serial No. 299,163

2 Claims. (Cl. 321—2)

My invention relates, in general to vibrator conversion systems, and in particular to circuit arrangements for starting.

When vibrator conversion systems are used in the 24 to 32 range of input voltages, there is a tendency to flash, burning out either the fuse or the vibrator itself. This tendency is particularly noticeable when the system is started since the transformer steady state flux conditions have not been established. When shunt driven vibrators are used, it is almost impossible to start the system unless a value of primary resistance is used which severely limits the power output.

An object of my invention is, therefore, to provide a circuit which will make fuse blowing or flashing impossible.

Another object is to provide a minimum of current surging on starting.

Another object is to render flashing or fuse blowing impossible due to a momentary interruption of the input voltage, such as caused by a loose connection.

Other objects and a fuller understanding may be had by referring to the following description and claims taken in conjunction with the accompanying drawing, in which:

The figure is a diagrammatic illustration of a circuit embodying the features of my invention.

The invention will be described in connection with the circuit shown in my pending application, Serial No. 252,759, for Converter Systems, now Patent No. 2,633,560. With reference to the figure, the invention comprises, generally, an interrupter 10, a filtration transformer 20, a power transformer 28 adapted to supply power to a rectifier 40, and a rectifier 50 adapted to supply power to relay 51.

The interrupter may be of any suitable design and comprises, generally, two opposed contacts 11 and 12 and a vibrating contact 13 disposed therebetween, which is connected to a terminal 15 of a direct current source 14. The filtration transformer 20 has two primary windings 21 and 22 and two secondary windings 23 and 24. The power transformer 28 has a primary winding 29 and a secondary winding 30. The primary winding 29 has two end terminals 31 and 32 and an intermediate terminal 33. The secondary winding 30 of the power transformer has two end terminals 34 and 35 and an intermediate terminal 36. A capacitor 37 is connected across the two end terminals 31 and 32 of the primary winding of the power transformer and a capacitor 38 is connected across the end terminals 34 and 35 of the secondary winding of the power transformer. The primary winding 21 of the filtration transformer is connected between the contact 11 of the interrupter and the end terminal 31 of the primary winding of the power transformer. Similarly, the primary winding 22 of the filtration transformer is connected between the contact 12 of the interrupter and the end terminal 32 of the primary winding of the power transformer.

The secondary winding 23 of the filtration transformer is connected between the end terminal 34 of the secondary winding of the power transformer and input terminal 41 of the rectifier 40. The secondary winding 24 of the filtration transformer is connected between the end terminal 35 of the secondary winding of the power transformer and an input terminal 42 of the rectifier 40. The load 44 is connected between an output terminal 43 of the rectifier and the intermediate terminal 36 of the secondary winding of the power transformer. A capacitor 45 may be connected across the load 44. The intermediate terminal 33 of the primary winding of the power transformer is connected to the terminal 16 of the direct current source 14. A resistor 48 is connected across the primary winding 21 of the filtration transformer and a resistor 49 is connected across the secondary winding 24 of the filtration transformer.

The primary and secondary windings of the filtration transformer have turns ratio substantially equal to the turns ratio of the primary and secondary winding of the power transformer to eliminate the effect of the load current on the primary excitation current. The filtration transformer and the power transformer are preferably linear.

The capacitors 37 and 38 excite the power transformer with current for generating in said power transformer a voltage opposing the voltage supplied by the interrupting means.

When relay 51 is de-energized resistor 58 is inserted in the primary circuit 60 by opening contacts 53 and 54, while starting capacitor 59 is inserted as a buffer by contact 52 engaging 53.

Also, when relay 51 is de-energized load 44 is disconnected by opening of contacts 56 and 57.

Resistor 58 is of such value that flashing of vibrator contacts is prevented during starting.

Energizing of the system by battery will cause interrupter 10 to start with resistor 58 in circuit capacitor 59 acting as buffer, and load 44 disconnected. Resistor 58 which is sufficiently large to prevent flashing is not sufficiently large to prevent normal A. C. voltage to be generated across transformer 28 under no load conditions.

However, when normal A. C. voltage occurs across transformer 28, nearly steady state flux conditions exist and it is entirely safe to short out resistor 58, and simultaneously connect load 44.

Rectifier 50, which is usually a small dry disc rectifier, is connected across transformer 28 and supplies direct current to energize relay 51 which is a conventional D. C. relay.

Starting capacitor 59 is disconnected during running condition, since no buffer capacitor is needed with this system.

No momentary power interruption can cause the interrupter 10 to flash, since if the A. C. voltage on transformer 28 is lowered, the relay 51 immediately cuts in the protective resistor 58.

It is immaterial as to how long the interrupter 10 takes to start since the protective resistor 58 must remain in the circuit until the excitation of the transformer 28 becomes normal.

Although the invention has been described in its preferred form, with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A converter circuit energized from a direct current source and disposed between interrupting means and output rectifying means, said converter circuit comprising a filtration transformer having primary and secondary windings, a power transformer having primary and secondary windings, first circuit means for connecting the primary windings in series with each other and with the interrupting means and the direct current source, whereby said primary windings are excited by direct current controlled by said interrupting means, second circuit means for connecting the secondary windings in series with each other and with the output rectifying means, capacity means in circuit relation with said power transformer for generating in said power transformer a voltage opposing the voltage supplied by the interrupting means, current limiting means disposed in series with said direct current source and interrupting means, a starting buffer capacitor, a relay having normally open first contact means, normally closed second contact means, and normally open third contact means, said first contact means connected in parallel with said current limiting means, said second contact means connected in series with said starting buffer capacitor and in circuit relationship with said interrupter means, and said third contact means connected in circuit relationship with a load, said relay being responsive to the voltage generated by said power transformer and upon actuation thereby shunting said current limiting means by closing said first contact means and disconnecting said starting buffer capacitor by opening said second contact means and connecting the load to said power transformer by closing said third contact means.

2. A converter circuit energized from a direct current source and disposed between interrupting means and output rectifying means, said converter circuit comprising a filtration transformer having primary and secondary windings, a power transformer having primary and secondary windings, said secondary windings of said power transformer having a center tap, first circuit means for connecting the primary windings in series with each other and with the interrupting means and the direct current source, whereby said primary windings are excited by direct current controlled by said interrupting means, second circuit means for connecting the secondary windings in series with each other and with the output rectifying means, capacity means in circuit relation with said power transformer for generating in said power transformer a voltage opposing the voltage supplied by the interrupting means, current limiting means disposed in series with said direct current source and interrupting means, a starting buffer capacitor, a relay having normally open first contact means, normally closed second contact means, and normally open third contact means, said first contact means connected in parallel with said current limiting means, said second contact means connected in series with said starting buffer capacitor and in circuit relationship with said interrupter means, and said third contact means connected in circuit relationship with a load, a rectifying device having two elements connected respectively across the secondary windings of the power transformer, said rectifying device having a third element connected in circuit relationship with said relay and said center tap of said secondary windings, said relay being responsive to rectified voltage generated by said power transformer and upon actuation thereby shunting said current limiting means by closing said first contact means and disconnecting said starting buffer capacitor by opening said second contact means and connecting the load to the power transformer by closing said third contact means.

References Cited in the file of this patent
UNITED STATES PATENTS

| | | |
|---|---|---|
| 2,186,473 | Bigalke | Jan. 9, 1940 |
| 2,305,380 | Edwards | Dec. 15, 1942 |
| 2,362,028 | Rosser et al. | Nov. 7, 1944 |
| 2,435,515 | Rosser | Feb. 3, 1948 |
| 2,543,232 | Dillion | Feb. 27, 1951 |
| 2,633,560 | Brown | Mar. 31, 1953 |